United States Patent
Kothari et al.

(10) Patent No.: US 9,135,050 B2
(45) Date of Patent: Sep. 15, 2015

(54) EXTENSIBLE NETWORK CONFIGURATION MANAGEMENT

(71) Applicant: VMware, Inc., Palo Alto, CA (US)

(72) Inventors: Piyush Kothari, Palo Alto, CA (US); Mukesh Baphna, Milpitas, CA (US); Chi-Hsiang Su, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 336 days.

(21) Appl. No.: 13/655,352

(22) Filed: Oct. 18, 2012

(65) Prior Publication Data
US 2014/0115576 A1    Apr. 24, 2014

(51) Int. Cl.
*G06F 9/455* (2006.01)
(52) U.S. Cl.
CPC .................................. *G06F 9/45558* (2013.01)
(58) Field of Classification Search
None
See application file for complete search history.

(56) References Cited

U.S. PATENT DOCUMENTS

| | | | |
|---|---|---|---|
| 7,522,611 B2* | 4/2009 | Loge et al. | 370/395.72 |
| 2010/0214949 A1* | 8/2010 | Smith et al. | 370/254 |
| 2013/0227668 A1* | 8/2013 | Mocanu | 726/8 |

* cited by examiner

*Primary Examiner* — Sisley Kim

(57) ABSTRACT

Techniques are disclosed for a management application running on a virtualization management platform and a module on a virtual machine host to communicate via an opaque pass-through channel for transporting data through the management platform and intermediate layer(s) of the virtual machine host between the management application and the module. In one embodiment, the data is identified by a key which is unique across management applications and includes a namespace registered by the management application on the management platform and registered by the module on the virtual machine host. In another embodiment, the namespace may indicate an association of the data with one or more entities such as a distributed virtual switch, port groups, ports, and virtual machine hosts. Configuration property settings for an entity may be propagated to its sub-entities based on inheritance. Further, the data may be persisted in database(s) of the management platform and/or the intermediate layer(s).

18 Claims, 6 Drawing Sheets

EXTENSIBLE NETWORK CONFIGURATION MANAGEMENT

BACKGROUND

Computer virtualization is a technique that involves encapsulating a computing machine platform into a virtual machine (VM) executed under the control of virtualization software running on a hardware computing platform (also referred to herein as a "host server"). A group of hardware computing platforms may be organized as a cluster to provide resources for VMs. In a data center, it is common to see hundreds, even thousands, of VMs running on multiple clusters of host servers.

An administrator may use virtualization management software to manage virtual machine configurations and computing resource allocations. Because of the large number of VMs managed within some data centers, and sometimes, across multiple data centers, some administrator tasks are automated. For example, software techniques such as adaptive resource scheduling and adaptive power management have been developed to assist the administrator in balancing workloads across host servers and powering host servers on and off as needed.

One feature of virtualized computing environments controlled by the virtualization management software is virtual networking. VMs can be created with software-based virtual network adapters that are logically connected to physical network adapters in the host computer. The virtual network adapters are connected to the physical network adapters through software-based virtual switches. One way to manage virtual network connections in data centers with a large number of VMs running on multiple host servers is via a "distributed virtual switch" (DVSwitch) described in U.S. Pat. No. 8,195,774, incorporated in its entirety herein by reference. DVSwitches permit users to manage virtual switches on multiple host servers as if the ports of those virtual switches belonged to a single switch. Further, DVSwitches persist port runtime states across host servers.

Virtualization software may incorporate a variety of modules to enhance or extend the functionality of DVSwitches and other aspects of the virtualization software. For example, a module may encrypt packets passing through a distributed virtual port (DVPort) of a DVSwitch. Management software running on a virtualization management platform may configure and monitor modules across host systems. In some cases, the management software communicates with the modules via interfaces having fixed type properties and methods on the virtualization management platform and intermediate software layer(s) (also referred to herein as "intermediate layers") of the virtualization software. Such rigid interfaces are difficult to change, particularly as the number and/or complexity of intermediate layers increase. To expose a new module feature to management software, for example, the data model and interfaces of the virtualization management platform and the intermediate layers must all be changed. In such a case, interface dependency among the various interfaces may require the virtualization management platform and the intermediate layers to be upgraded simultaneously.

SUMMARY

Embodiments presented herein provide techniques for transporting data between a module on a virtual machine host and a management application running on a virtualization management platform. For example, one embodiment includes a method for transporting data between a module on a virtual machine host and a management application running on a virtualization management platform. This method may include registering a namespace on the virtualization management platform by the management application and on the virtualization software by the module. Registering the namespace identifies the module and the management application as endpoints of a communication channel. The method may also include sending the data via the communication channel such that the data traverses at least the virtualization management platform and one or more intermediate layers of the virtualization software. In addition, the data may be opaque to, and not processed by, the virtualization management platform and the one or more intermediate layers.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Embodiments presented herein provide techniques for a management application running on a virtualization management module and a module of a virtual machine host to communicate via a pass-through channel which transports data that is opaque to the management platform and intermediate layer(s) of the virtual machine host. In general, the module may run on the virtual machine host and may enhance or extend functionality of, e.g., the host itself or a DVSwitch supported by the host. The data being transported may include module configuration data or per-port runtime data. Such data may be sent in a binary format. In one embodiment, the data is identified by a key unique across management applications that includes a namespace registered by the management application on the management platform and registered by the module on a virtual machine host. As used herein, "namespace" refers to an abstract container which includes a set of identifiers. In one embodiment, the registered namespace indicates an association of the data with one or more entities including DVSwitch(es), DVPort group(s), DVPort(s), and virtual machine host(s). Further, the data may include configuration property settings for an entity propagated to sub-entities based on inheritance of configuration properties. Further still, the data and the opaque data channel may be persisted in database(s) of the management platform and the intermediate layer(s).

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1:
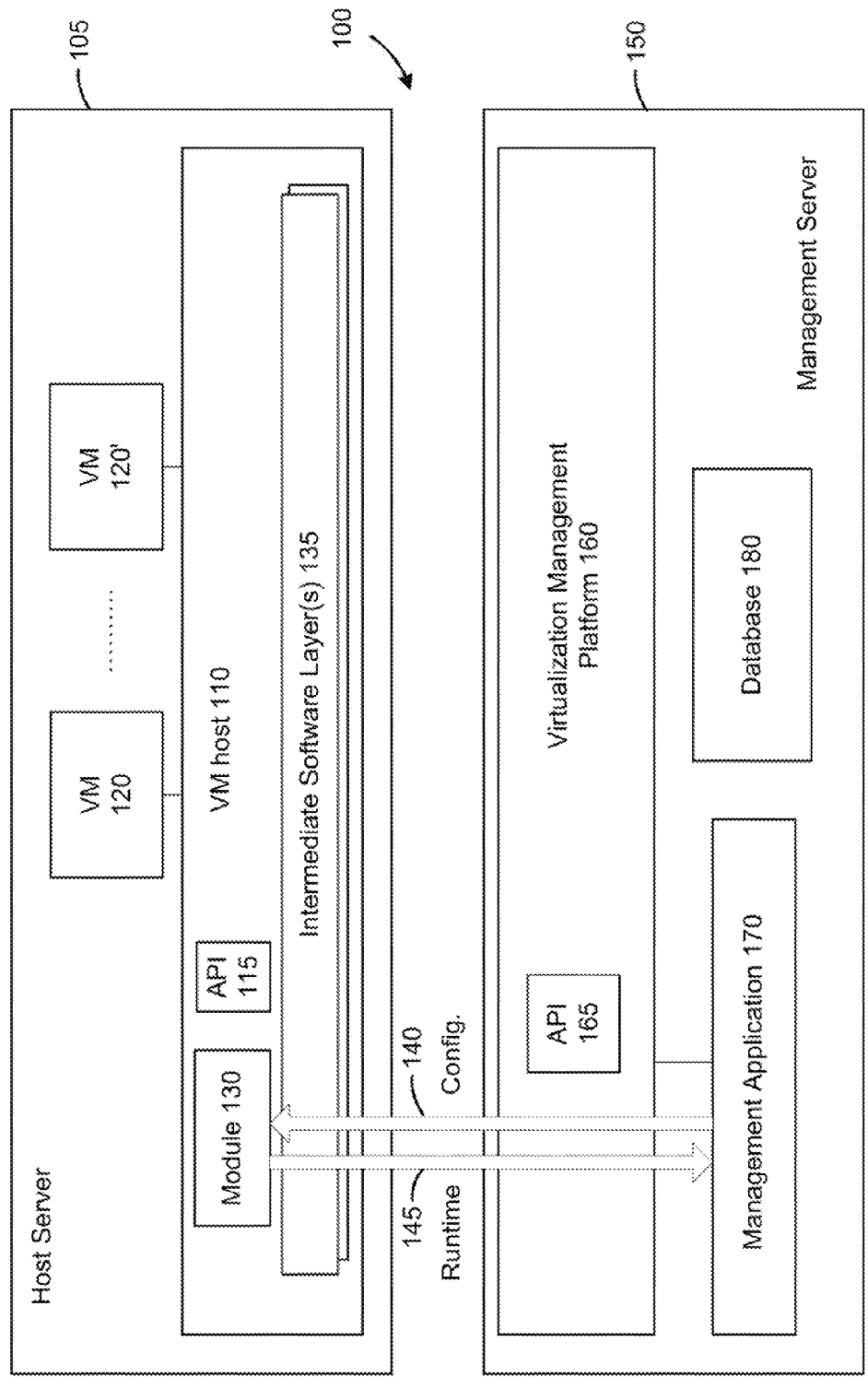
FIG. 1 depicts a system in which embodiments presented herein may be implemented.

FIG. 1 depicts a system 100 in which embodiments may be implemented. As shown, the system 100 includes a host server 105, management server 150, and opaque pass-through channels 140, 145. Host server 105 is configured to provide virtualization-based distributed services to information technology environments. Illustratively, host server 105 includes virtual machine host 110. The virtual machine host 110 itself may include virtualization software that enables hardware resource sharing between virtual machines and provides an interface between guest software running on virtual machines 120, 120' and the underlying hardware of host server 105. VM host 110 may run directly on hardware components of host server 105 or on top of an operating system of host server 105. In one embodiment, VM host 110 may include one or more software layers 135, also referred to herein as "intermediate layers," such as a low-level virtual machine kernel (vmkernel), a layer used to interface with the vmkernel, etc. The intermediate layer(s) 135 may have interfaces (e.g., APIs) with fixed type properties and methods, which are bypassed by opaque pass-through data channels. As discussed, absent the opaque pass-through data channels, module 130 and management application 170 may communicate via the interfaces of the intermediate layer(s) 135. In a particular embodiment, VM host 110 may be a VMware ESX® Server.

VM host 110 abstracts processor, memory, storage, and/or networking resources into VMs 120, 120'. That is, VM host 110 partitions host server 105 into multiple secure and portable VMs 120 that run side-by-side on host server 105. Each of the VMs 120, 120' may represent complete systems—with processors, memory, networking storage, BIOS.

Module 130 is an extension for VM host 110 which enhances or extends the functionality of VM host 110. As shown, module 130 is loaded in VM host 110. In one embodiment, VM host 110 may provide support for DVSwitches, as discussed in greater detail below. In such a case, module 130 may enhance or extend the functionality of the DVSwitch(es). For example, module 130 may modify packets sent through a DVPort of a DVSwitch.

Illustratively, VM host 110 includes an API 115 which allows module 130 to register namespaces on VM host 110. Such registered namespaces may be included in keys which identify data and indicate ownership of the data. The namespaces may also associate configuration data with one or more entities so that the configuration properties are set on those associated entities. Further, the configuration properties may be propagated to sub-entities of the entity based on inheritance. Registering a common namespace with both the virtualization software and virtualization management platform 160 creates an opaque pass-through channel, such as channels 140, 145.

For example, FIG. 1 shows an opaque pass-through channel 140 with management application 170 and module 130 as endpoints. Data sent (e.g., by invoking an API of virtualization management platform 160) from management application 170 via opaque pass-through channel 140 is passed from virtualization management platform 160 to a first intermediate layer of VM host 110 and thereafter to subsequent intermediate layer(s) of VM host 110, if any. The data is then transmitted (e.g., via an API of the last intermediate layer) to module 130. Here, the opaque pass-through data channel 140 bypasses the interfaces of the intermediate layer(s) 135 and the management platform having fixed type properties and methods.

Channel 140 is a pass-through channel in the sense that virtualization management platform 160 and intermediate layer(s) 135 of VM host 110 do not process data sent through channel 140. Indeed, the content and format of such data may be opaque to management platform 160 and the intermediate layer(s) 135 of VM host 110 in the sense that management platform 160 and intermediate layer(s) 135 of VM host 110 are agnostic to the content of the data and unable to manipulate it, hence the term "opaque pass-through channels." Note, this is in contrast to the interfaces discussed above having fixed type properties and methods. Use of such interfaces requires the management platform 160 and intermediate layer(s) 135 of VM host 110 to understand and process data being transmitted through them.

In one embodiment, data sent through opaque pass-through channel 140 may be any kind of data in binary format. Such data may include configuration information, files, modules, etc. In another embodiment, the data and the opaque pass-through channel 140 may be persisted in a database 180 on management server 150, as discussed in greater detail below. Opaque pass-through channel 145 is similar to opaque pass-through channel 140, except that data is transported by channel 145 from module 130 to management application 170.

As shown, management server 150 includes virtualization management platform 160 (also referred to herein as "management platform") and management application 170 running on management platform 160. Management platform 160 provides an application used to manage a virtualization infrastructure, including managing host servers, virtual machines running within each host server, provisioning, migration, resource allocation, and so on. In one embodiment, management platform 160 may be a VMware vCenter® Server. As shown, management platform 160 includes an API 165 used to register namespaces on management platform 160. As discussed, registering a namespace on both management platform 160 and VM host 110 creates an opaque pass-through channel for communication between the management application and the module which registered the namespace.

Management application 170 manages module 130 by, e.g., configuring and monitoring module 130. As shown, management application 170 communicates with module 130 via opaque pass-through channels 140, 145. Illustratively, configuration data may be sent from management application 170 via opaque pass-through channel 140 to module 130, which listens to channel 140. In one embodiment, the configuration data may be associated with one or more entities such as DVSwitch(es), DVPort group(s), DVPort(s), and VM host(s). In addition, module 130 may send back per-port runtime data via opaque pass-through channel 145 to management application 170, which listens to channel 145. Of course, in alternative embodiments, opaque pass-through channels may be bi-directional. In such a case, configuration, runtime, and other data may be transported via the same opaque pass-through channel.

Figure 2:
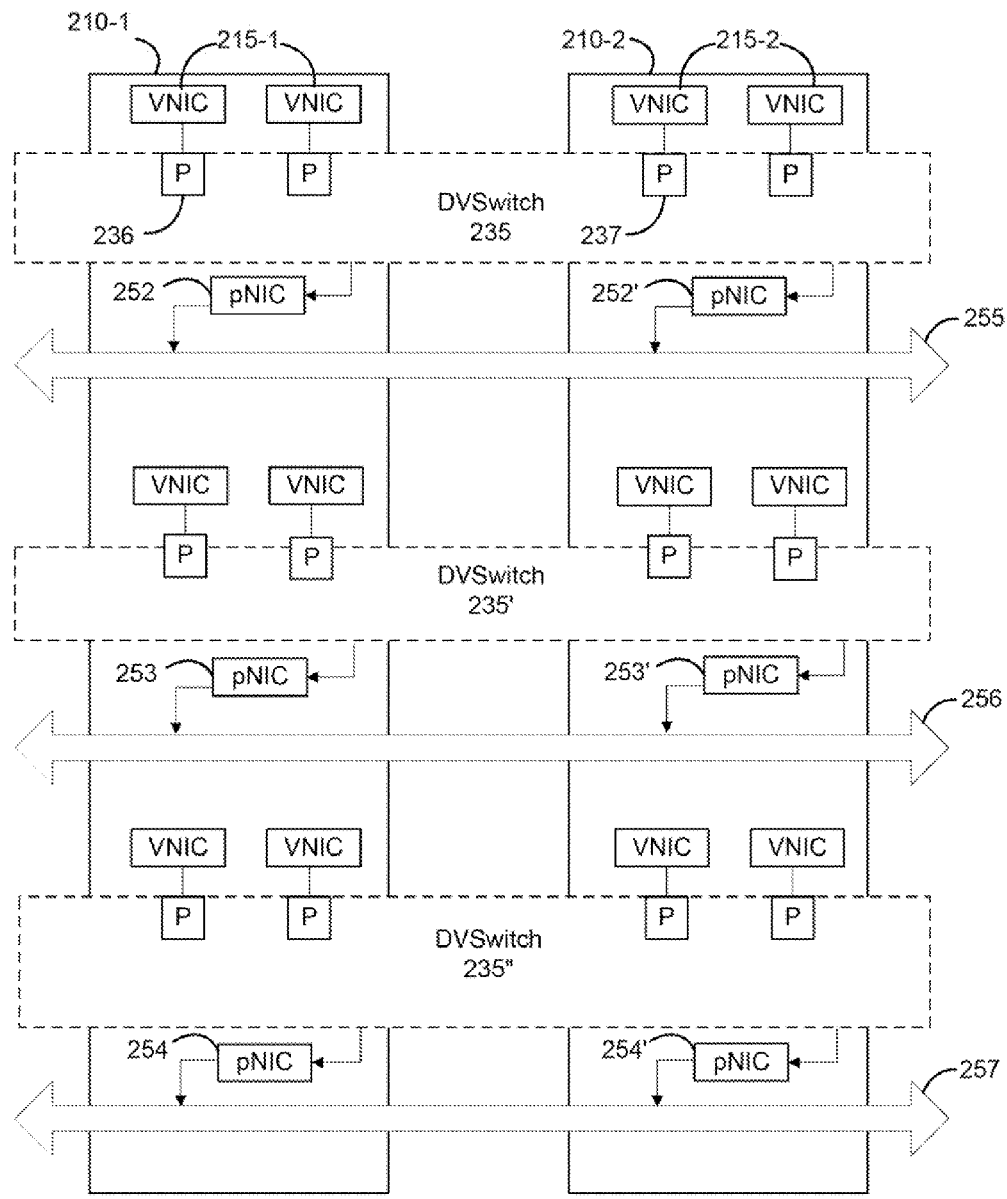
FIG. 2 depicts an example configuration of DVSwitches, according to an embodiment.

FIG. 2 depicts an example configuration of DVSwitches, according to an embodiment. As shown, DVSwitches 235, 235', 235" each span first and second host systems 210-1, 210-2. In this example, each virtual network interface card (vNIC) is attached to one of DVSwitches 235, 235', 235", which are associated with corresponding physical network interface cards (pNICs) for each host system 210. Thus, vNICs 215-1, 215-2, each of which may correspond to an individual VM, are associated with a DVPort, e.g., 236, 237, which are collectively managed via DVSwitch 235. DVSwitch 235 in turn provides connectivity for vNICs 215-1, 215-2 to network 255 via pNICs 252, 252'. In this way, the DVSwitch represents a convenient abstraction of underlying logic implementing links between vNICs and virtual switches. This approach also allows users (e.g., an administrator) to manage the DVSwitch as an abstraction of a physical switch connecting each of the VMs to a particular local area network (LAN). Because the DVSwitch abstracts out the settings of individual virtual switches and virtual ports, the user only needs to be concerned with attaching the DVSwitch to each vNIC. Once done, virtual ports and switches underlying the DVPorts and DVSwitches may automatically be configured when restarting or suspending and resuming a VM.

As shown by the example of FIG. 2, a single host system 210-1 may interact with a plurality of DVSwitches, each associated with a corresponding network. In the present example, host systems 210-1, 210-2 each interact with DVSwitches 235, 235', 235", which in turn are connected to networks 255, 256, and 257, respectively. Host system 210-1 includes pNIC 252 connecting DVSwitch 235 to network 255, pNIC 253 connecting DVSwitch 235' to network 256, and pNIC 254 connecting DVSwitch 235" to network 257. Host system 210-2 includes corresponding components, although many other configurations are possible, as would be recognized by those skilled in the art.

Figure 3:
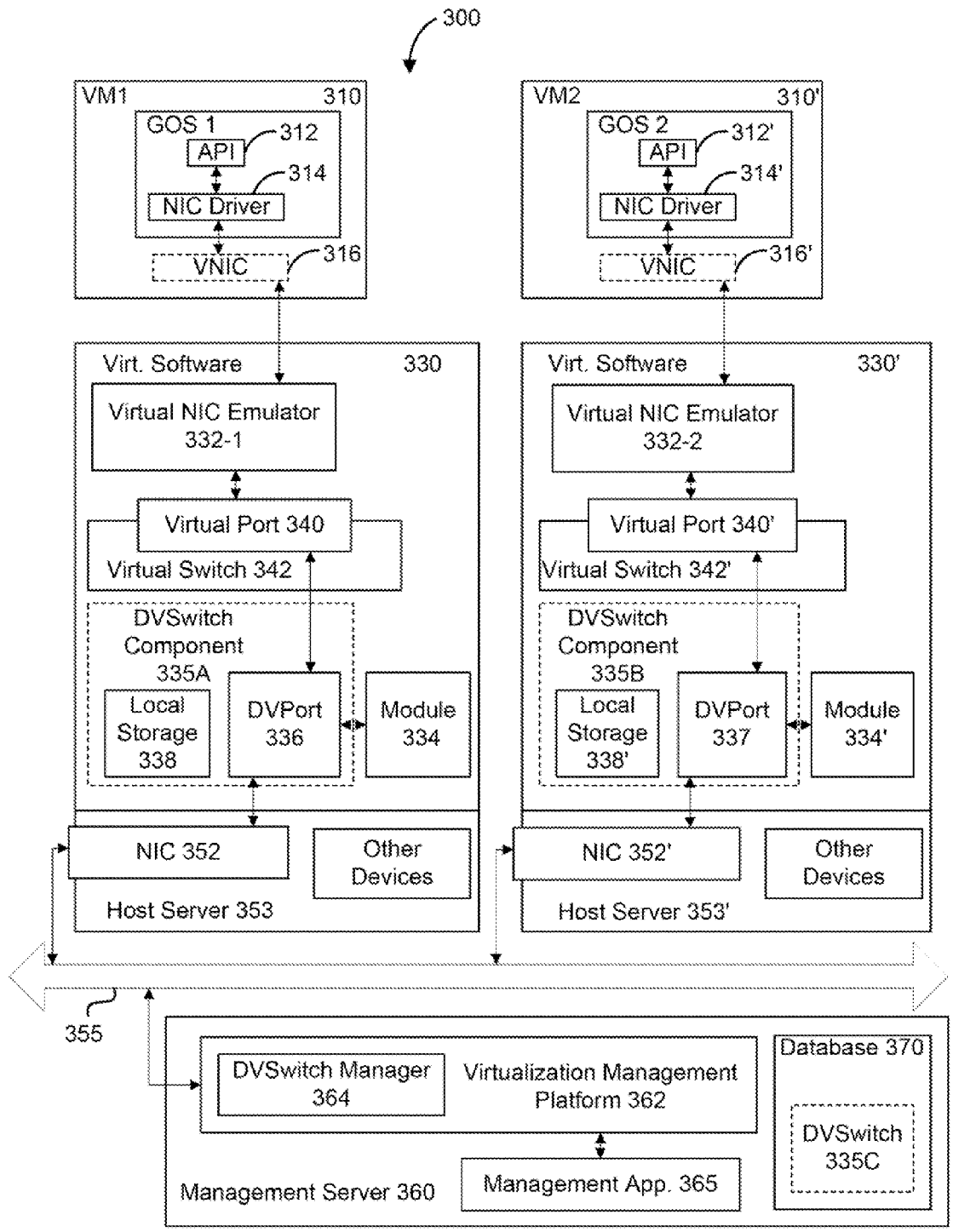
FIG. 3 depicts a collection of example modules enhancing or extending a DVSwitch and managed by an application running on a virtualization management platform, according to an embodiment.

FIG. 3 depicts a collection of example modules enhancing or extending a DVSwitch running on a virtualization management platform, according to an embodiment. As shown, the DVSwitch comprises DVSwitch components 335A, 335B. The DVSwitch is a software abstraction which binds virtual switches 342, 342' in the managed collection into a single, logical configurable entity. FIG. 3 represents only two hosts 353, 353' each having a single VM 310, 310' and corresponding vNIC emulators 332-1, 332-2, for purpose of illustration. However, a DVSwitch may span any number of hosts each having any number of VMs, which each have, in turn, any number of vNICs, any of which may be limited in number by available hardware resources of the individual hosts.

The DVswitch, as a software abstraction, resides in a distributed manner, hence the term "distributed" virtual switch. For example, DVSwitch components 335A, 335B reside in hosts 353, 353' as well as DVSwitch server 100. FIG. 3 illustrates DVSwitch components 335A, 335B with a dotted line box to indicate which portions of DVSwitch 335A, 335B make up the DVSwitch. In addition to these components, logic implementing DVSwitch functionality is located in VM hosts 330, 330' and DVSwitch manager 364.

As shown in FIG. 3, vNIC emulators 332-1, 332-2 maintain virtual ports 340, 340' for each vNICs 316, 316', respectively. Each vNIC emulator 332-1, 332-2 interacts with NIC drivers 314, 314' in VMs 320, 320' to send and receive data to and from VMs 120, 120'. For example, each vNIC emulator 332-1, 332-2 may maintain the state for one or more vNICs for each VM 320, 320'. Alternatively, multiple instances of vNIC emulators 332-1, 332-2 may be instantiated within a virtualization software layer of VM hosts 330, 330', respectively. In either case, a single VM may have one or more vNICs, which may be implemented by one or more vNIC emulators. Illustratively, FIG. 3 shows one vNIC for each VM, and only one VM for each host. Note, however, the discussion of vNICs 316, 316' actually describes a vNIC state implemented and maintained by each vNIC emulator 332-1, 332-2. As mentioned previously, virtual devices such as vNICs 316, 316' are software abstractions convenient to discuss as though part of VMs 310, 310', but are actually implemented by virtualization software of VM hosts 330, 330' using emulators 332-1, 332-2. The state of each VM 310, 310', however, includes the state of its virtual devices, which is controlled and maintained by the underlying VM hosts 330, 330'.

Virtual switches 342, 342' connected to the same physical network 355 may be managed as one DVSwitch. Physical network 355, may be, e.g., a local area network. In FIG. 3, DVSwitch 335 includes DVPorts 336, 337. Each DVPort is a software abstraction that encapsulates the "personality" (i.e., both a configuration and runtime state) of a corresponding virtual port. For example, DVPort 336 may contain one or more data structures representing the configuration and runtime states of a virtual port 340 of a virtual switch 342 on host server 353. Each DVPort 336, 337 may be created with a configuration predefined by a network administrator. Virtual ports 340, 340' are created and start with a blank configuration state, but once associated with a DVPort, assume the configuration and runtime state of the associated DVPort. When a VM is migrated or powered off and on, the "connection" between a DVPort and a virtual NIC is not affected because the DVPort persists and migrates with the VM to which it is connected.

DVSwitch 335 and DVPorts 336, 337 are created from the physical resources available to physical NICs 352, 352' in the managed domain of hosts 353, 353'. Once created, database 370 in DVSwitch server 360 stores the state of DVSwitch 335 and DVPorts 336, 337. For states that are global to a given DVSwitch 350, a DVSwitch manager 364 of a virtualization management platform 362 may push read-only copies to each of the hosts 353, 353' in the managed domain. States that are specific to a given DVPort 336, 337, however, are needed by the host where the DVPort's corresponding virtual port 340, 340' is located. Thus, the DVSwitch manager 364 may push the DVPort state only to the necessary host. In addition to being stored in database 370, some DVSwitch states may be cached on each host in the managed domain via local storage 338, 338'.

As depicted in FIG. 3, a management application 365 running on virtualization management platform 362 manages modules 334, 334' of VM hosts 330, 330'. Modules 334, 334' are examples of modules which may enhance or extend the functionality of DVPorts 336, 337 of the DVSwitch, respectively. Of course, other types of modules are broadly contemplated. In general, such modules may enhance or extend the functionality of one or more of individual DVPorts; DVPort groups; DVSwitches; or other aspects of the VM hosts, as discussed in greater detail below.

Management application 365 may communicate with modules 334, 334' via opaque pass-through channels. In one embodiment, management platform 362 and VM host 330 may provide APIs used to register a common namespace on the platform 362 and host 330. As discussed, by registering a namespace on a management platform and on a VM host, an opaque pass-through channel may be defined having endpoints at the management application and the module(s)

which registered the namespace. The management application and the module(s) communicate via the opaque pass-through channel.

In one embodiment, data may be sent through a particular opaque pass-through channel indicated by a namespace of a key which identifies the data. Further, configuration data sent from the management application may be associated based on the namespace with one or more entities, including the DVSwitch, DVPort groups (not shown); DVPorts 336, 337; and VM hosts 330, 330'. Persons skilled in the art will appreciate that the particular association of data with the entities may depend on the type of module to which the data is sent, the feature(s) to which the data relates, and the like. For example, the data may include configuration information for a module feature that enhances a general DVSwitch feature, as opposed to, e.g., a feature of a DVPort of the DVSwitch. In such a case, the data may be identified by a key that includes a namespace associating the data with the DVSwitch. As another example, the data may relate to configuration of a firewall for a particular virtual machine host. In this case, the key may include a namespace that associates the data with the particular host.

In another embodiment, data associated with the DVSwitch may include configuration property settings that are automatically propagated based on inheritance to DVPort groups of the DVSwitch. Similarly, data associated with DVPort groups may include configuration property settings that are automatically propagated to DVPorts of the DVPort groups. For example, the data may include a setting for a configuration property which is to be set on every DVPort of a DVSwitch. In such a case, data which includes the configuration property setting may be associated with individual DVPorts, and the data may then be sent in succession to the module and the configuration property set on a per-DVPort basis. Alternatively, the data may be associated with the DVSwitch itself, and the configuration property may be set on the DVSwitch, from where it is automatically propagated to all DVPorts of the DVSwitch.

In yet another embodiment, database 370 may persist data being sent and opaque pass-through channels across virtualization management platform 362 reboots, management application 365 or module 334, 334' restarts, and the like. Such data may then automatically be sent to, for example, new or restarted modules which register the namespace on their respective hosts.

Figure 4:
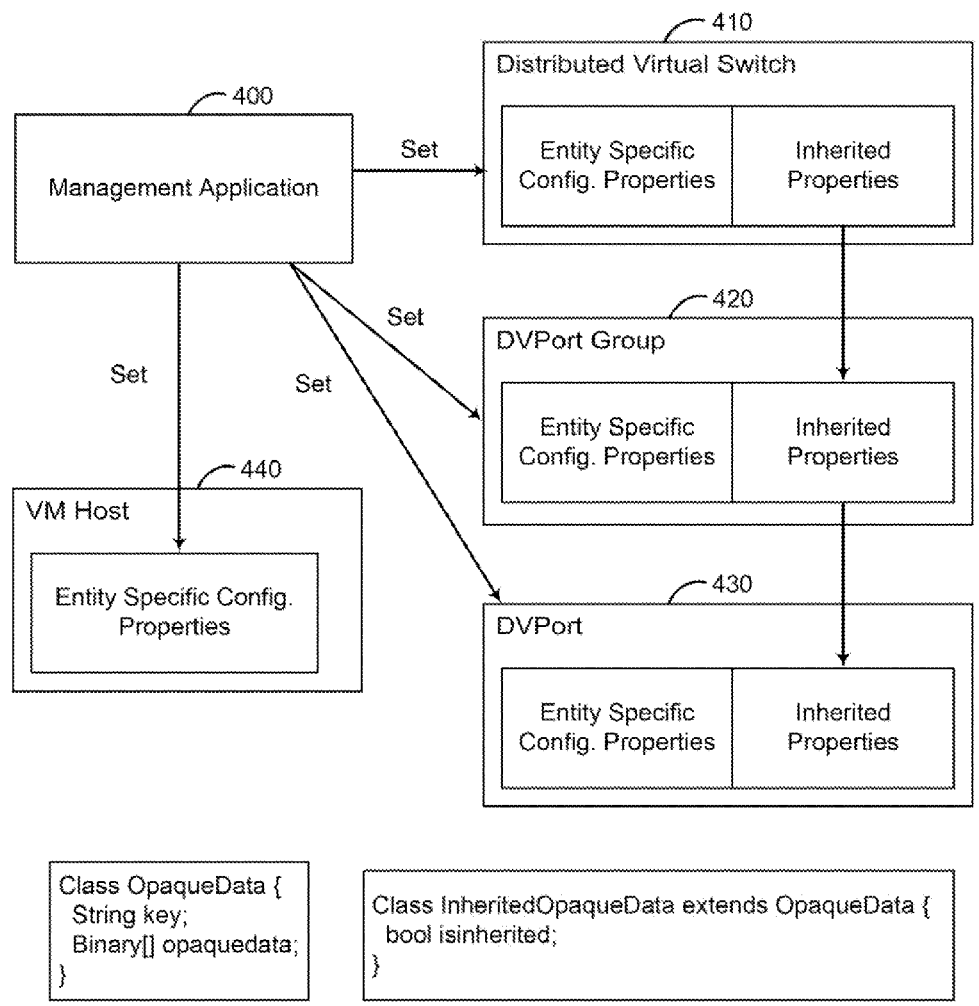
FIG. 4 illustrates associating data sent via opaque pass-through channels and inheritance of configuration property settings, according to an embodiment.

FIG. 4 illustrates associating data sent via opaque pass-through channels and inheritance of configuration property settings, according to an embodiment. As shown, data sent by management application 400 may be associated with host members 440, DVSwitch 410, DVPort groups 420, and/or DVPorts 430. The particular association may depend on the type of module to which the data is sent, the feature(s) to which the data relates, and the like. Entity-specific configuration properties may exist for a given module. For example, the module may provide an enhancement for a general DVSwitch feature, such as the uplink ports of the DVSwitch. In such a case, data sent to the module may be identified by a key which includes namespace "com.switch1.uplinkports.configuration," where ".switch1" associates the opaque data with a DVSwitch named "switch1." As another example, the module may modify (e.g., encrypt) packets sent through a particular DVPort. In this case, configuration data sent to the module may be associated by a namespace with the DVPort.

As shown, data may be sent via opaque pass-through channels as objects of class "OpaqueData." Each OpaqueData object includes a string "key" which includes a namespace. As discussed, the namespace may associate data with one or more entities such as DVSwitches, DVPort groups, DVPorts, and VM hosts. Illustratively, the data is a binary array labeled "opaquedata."

As further shown in FIG. 4, data may be sent via opaque pass-through channels as objects of class "InheritedOpaqueData." Illustratively, class "InheritedOpaqueData" extends class "OpaqueData" and includes a boolean "isinherited." If inheritance is enabled, configuration property settings for a particular entity may be propagated to one or more sub-entities of the entity. For example, an InheritedOpaqueData object having data which includes configuration property settings, "isinherited" value of true, and a key which includes a namespace associated with a DVSwitch may be sent to a module on a VM host. Configuration properties of the DVSwitch may then be set by the management platform (which, as discussed, manages the DVSwitch) according to the data, and the settings for the properties may further be propagated by the management platform to DVPort groups of the DVSwitch, and from there, DVPorts of the DVPort groups. Further, when the DVSwitch is expanded to include, for example, additional DVPort groups or additional DVPorts, the configuration property settings may automatically be propagated by the management platform to those additional sub-entities.

Figure 5:
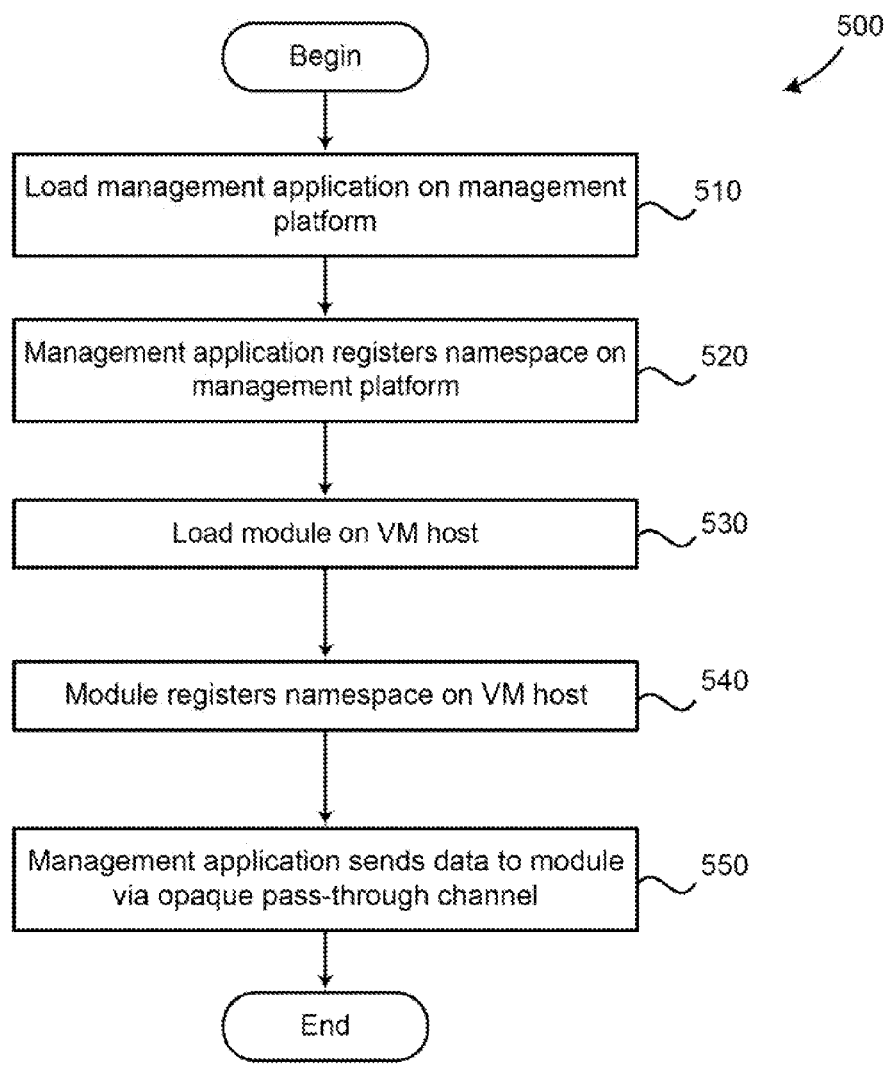
FIG. 5 illustrates a method for transporting configuration data from a management application to a module via an opaque pass-through channel, according to an embodiment.

FIG. 5 illustrates a method 500 for transmitting data from a management application to a module of a VM host via an opaque pass-through channel, according to an embodiment. As shown, the method 500 begins at step 510, where a management application is loaded on a virtualization management platform that is running on, e.g., a management server. At step 520, the management application registers a namespace on the management platform. As discussed, the management platform may expose API(s) which allow the management applications to register namespaces on the management platform. In one embodiment, namespaces may be unique across management applications, thereby preventing opaque data objects identified by keys which include particular namespaces from being accidentally overwritten by management applications that have not registered the particular namespaces.

At step 530, a VM host managed via the management platform loads a module used to enhance or extend the functionality of the VM host. At step 540, the loaded module registers on the VM host the same namespace that was registered by the management application on the management platform at step 420. Similar to registration on the management platform, the VM host may expose API(s) which allow the module to register namespaces, and further, the VM host may enforce uniqueness of namespaces. The registering of the namespace by the module and the management application defines endpoints of an opaque pass-through channel used to send data between the management application and the module without having to use interfaces of the management platform and intermediate layers having fixed properties and methods. The format and interpretation of data sent through the channel is contract only between these endpoints. That is, the management platform and intermediate layer(s) of the VM host through which the data passes may be agnostic to the content and format of the data. In addition, the opaque pass-through channel is pass-through in the sense that neither the management platform nor the intermediate layer(s) process data being sent through the channel.

At step 550, the management application transmits data to the module via the opaque pass-through channel. For example, the management application may convert the data, which as discussed may be, e.g., configuration information, a file, a module, etc., to a binary format before sending it to the management platform. In turn, the module may convert the binary data back into the configuration information, file, module, etc. upon receipt. Because data may simply be sent as binary data via the opaque pass-through channel, the management application and the module can communicate without relying on interfaces (e.g., APIs) of the management platform and the intermediate layers for sending particular kinds of data.

In one embodiment, the data may be sent through an opaque pass-through channel identified using a key, which itself identifies the appropriate namespace. Further, such a key may include a namespace which associates the data with one or more entities. In another embodiment, configuration properties set on an entity may be inherited by its sub-entities (and potentially sub-entities of those sub-entities, etc.).

In another embodiment, the data and opaque pass-through channel may be persisted in databases associated with one or more of the management platform and the intermediate layer(s). In such a case, the data may be sent to the modules again if the management server is rebooted, if the VM host or the module is restarted, and the like. Similarly, when a new module is added and registers the namespace, the management platform may automatically send stored data to the new module, thereby eliminating the need for the management application to resend the data.

Figure 6:
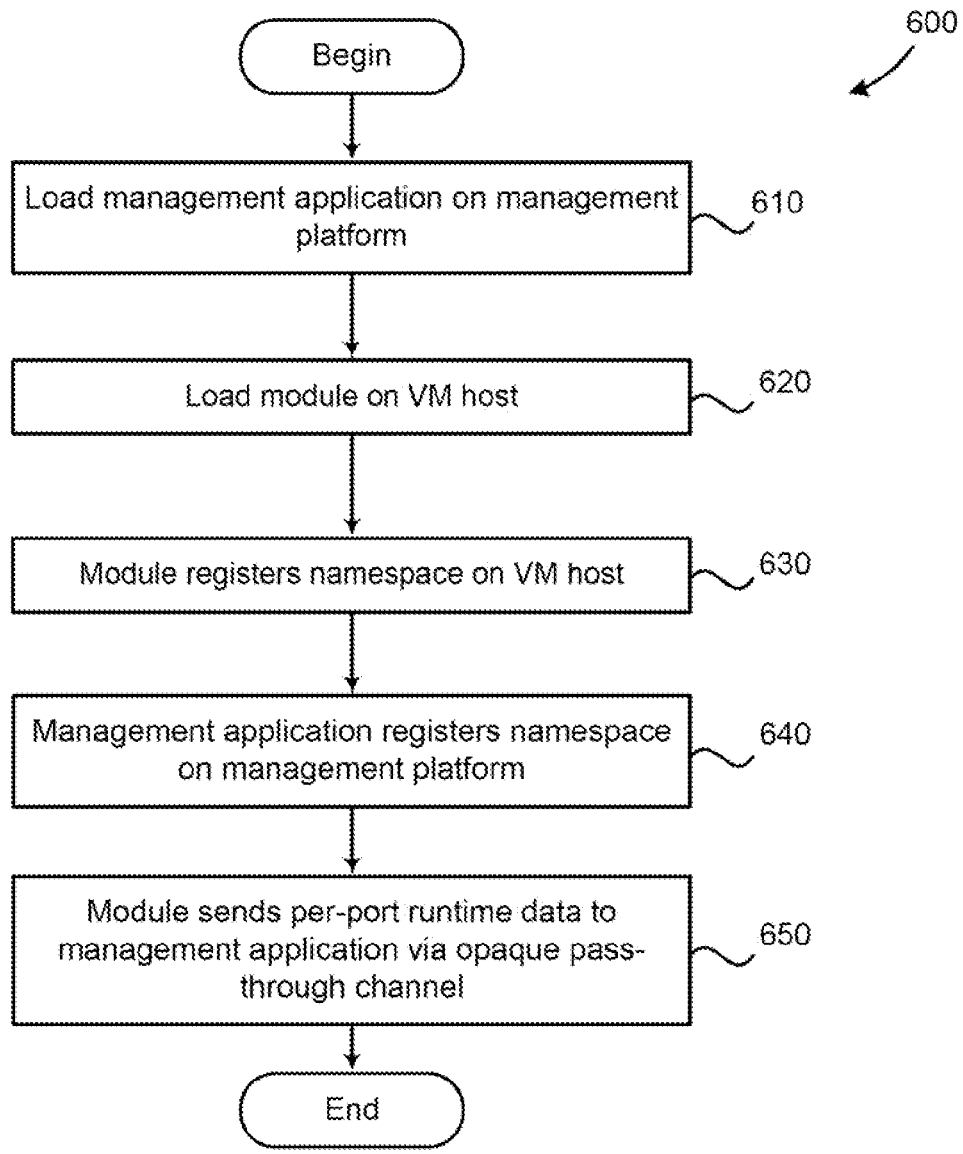
FIG. 6 illustrates a method for transporting per-port runtime data from a module to a management application via an opaque pass-through channel, according to an embodiment.

FIG. 6 illustrates a method 600 for transporting per-port runtime data from a module on a VM host to a management application via an opaque pass-through channel, according to an embodiment. As shown, the method 600 begins at step 610, where a management application is loaded on a management platform. At step 620, a module managed by the management application is loaded on the VM host. At step 630, the loaded module registers a namespace on the virtualization software, similar to step 540 of method 500. At step 640, the management application registers the namespace on the management platform, similar to step 530 of method 500.

At step 650, the module sends data to the management application via the opaque pass-through channel created by the registering of the namespace at steps 640 and 650, similar to step 550 of method 500. As discussed, the data being sent may generally include any kind of data, and the data may be in a binary format. In one embodiment, the data may include per-DVPort runtime information, and such runtime information may be collected (e.g., periodically) by the management platform and returned to the management application. For example, the module may perform encryption of packets sent through a DVPort. In such a case, runtime information about the number of packets encrypted, the encryption scheme(s) used, etc. may be collected by the management platform and returned to the management application, after which it may be, e.g., displayed to a user.

Advantageously, embodiments described herein provide an opaque pass-through channel for communication between a management application and a module it manages, without requiring integration with a management platform and intermediate layers between the management application and the module. As a result, new features may be added in the module and exposed to the management application without requiring changes to interfaces or data models of the management platform and the intermediate layers.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that VMs present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for transporting data between a module in virtualization software and a management application running on a virtualization management platform, the method comprising:

registering a common namespace on the virtualization management platform by the management application and on the virtualization software in a host server by the module to create a communication channel, wherein the registering identifies the module in the virtualization software and the management application as endpoints of the communication channel, and wherein the common namespace indicates an association with at least one of a distributed virtual switch, a port group of a distributed virtual switch, a port of a distributed virtual switch, and the host server;

sending, by the management application or the module, the data via the communication channel, wherein the data is associated with a key specifying the common namespace that identifies the data and indicates ownership of the data, wherein the data traverses at least the virtualization management platform and one or more intermediate layers of the virtualization software and at least relates to configuration of the module, wherein the data is converted to a binary format and is opaque to the virtualization management platform and the one or more intermediate layers, and wherein the data is not processed by the virtualization management platform and the one or more intermediate layers including a virtual machine kernel.

2. The method of claim 1, wherein the data is sent through the communication channel along with the registering namespace as a key.

3. The method of claim 1, wherein the module enhances or extends functionality of at least one of a distributed virtual switch and the virtualization software.

4. The method of claim 1, wherein configuration property settings of the distributed virtual switch are inherited by one or more port groups of the distributed virtual switch.

5. The method of claim 4, wherein configuration property settings of at least one port group are inherited by one or more ports of the at least one port group.

6. The method of claim 5, wherein the data is one of configuration data sent by the management application and per-port runtime data sent by the module.

7. The method of claim 1, further comprising:
converting the data to a binary format before sending the data via the communication channel.

8. The method of claim 1, further comprising:
storing the data and the communication channel in a database associated with one of the virtualization management platform and the one or more intermediate layers; and
sending, by the virtualization management platform, the data to one of the module, a new module, or a restarted module via the communication channel.

9. The method of claim 1, wherein the registering includes invoking an API of the virtualization software by the module and invoking an API of the virtualization management platform by the management application.

10. A non-transitory computer-readable storage medium containing a program which, when executed by processors on a management server and a host server, performs operations for transporting data between a module in virtualization software running in the host server and a management application running on a virtualization management platform, the operations comprising:

registering a common namespace on the virtualization management platform by the management application and on the virtualization software in the host server by the module to create a communication channel, wherein the registering identifies the module in the virtualization software and the management application as endpoints of the communication channel, and wherein the common namespace indicates an association with at least one of a distributed virtual switch, a port group of a distributed virtual switch, a port of a distributed virtual switch, and the host server;

sending, by the management application or the module, the data via the communication channel, wherein the data is associated with a key specifying the common namespace that identifies the data and indicates ownership of the data, wherein the data traverses at least the virtualization management platform and one or more intermediate layers of the virtualization software and at least relates to configuration of the module, wherein the data is converted to a binary format and is opaque to the virtualization management platform and the one or more intermediate layers, and wherein the data is not processed by the virtualization management platform and the one or more intermediate layers including a virtual machine kernel.

11. The computer-readable storage medium of claim 10, wherein the data is sent through the communication channel along with the registering namespace as a key.

12. The computer-readable storage medium of claim 10, wherein the module enhances or extends functionality of at least one of a distributed virtual switch and the virtualization software.

13. The computer-readable storage medium of claim 10, wherein configuration property settings of the distributed virtual switch are inherited by one or more port groups of the distributed virtual switch, and wherein configuration property settings of at least one port group are inherited by one or more ports of the at least one port group.

14. The computer-readable storage medium of claim 13, wherein the data is one of configuration data sent by the management application and per-port runtime data sent by the module.

15. The computer-readable storage medium of claim 10, the operations further comprising:
converting the data to a binary format before the data is sent via the communication channel.

16. The computer-readable storage medium of claim 10, the operations further comprising:

storing the data and the communication channel in a database associated with one of the virtualization management platform and the one or more intermediate layers; and sending, by the virtualization management platform, the data to one of the module, a new module, or a restarted module via the communication channel.

17. The computer-readable storage medium of claim 10, wherein the registering includes invoking an API of the virtualization software by the module and invoking an API of the virtualization management platform by the management application.

18. A system, comprising:

a processor; and a memory, wherein the memory includes a management program for transporting data between a module in virtualization software and the management program running on a virtualization management platform, the operations comprising:

registering a common namespace on the virtualization management platform to identify the management program as a first endpoint of a communication channel, wherein the common namespace is also registered on the virtualization software in a host server by the module to create the communication channel with the module as a second endpoint of the communication channel, and wherein the common namespace indicates an association with at least one of a distributed virtual switch, a port group of a distributed virtual switch, a port of a distributed virtual switch, and the host server;

sending, by the management program or the module, the data via the communication channel, wherein the data is associated with a key specifying the common namespace that identifies the data and indicates ownership of the data, wherein the data traverses at least the virtualization management platform and one or more intermediate layers of the virtualization software and at least relates to configuration of the module, wherein the data is converted to a binary format and is opaque to the virtualization management platform and the one or more intermediate layers, and wherein the data is not processed by the virtualization management platform and the one or more intermediate layers including a virtual machine kernel.

* * * * *